Patented June 4, 1946

2,401,549

UNITED STATES PATENT OFFICE 2,401,549

UNSATURATED CARBAMATE AND POLYMERS THEREOF

Albert G. Chenicek, Elmhurst, Long Island, N. Y., assignor to Pittsburgh Plate Glass Company, Pittsburgh, Pa., a corporation of Pennsylvania No Drawing. Application October 22, 1942, Serial No. 463,006

11 Claims. (Cl. 260—78)

This invention relates to a new class of unsaturated compounds and polymers thereof. The new chemical compounds are the secondary amides of (a) an unsaturated acid amide and (b) an acid ester of a polyhydroxy compound and carbonic acid. The new compounds have the structure:

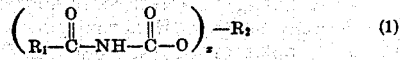

or

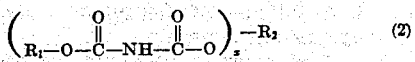

in which $R_1$ is an unsaturated organic radical, $R_2$ is the organic radical derived from a polyhydroxy compound and $x$ is a small whole number, preferably two.

The compounds of the type (1) are preferably prepared from unsaturated acid amides having three to five carbon atoms such as acrylyl, methacrylyl, crotonyl, isocrotonyl, vinyl acetyl, chloroacrylyl, chlorocrotonyl, tiglyl, angelyl, propiolyl, tetrolyl, pentinoyl, etc., amides. Acid amides having six to ten carbon atoms are also useful such as the hexenamides, the hexinoyl, amylpropiolyl, teracrylyl, cinnamyl, etc., amides.

The compounds of the type (2) are prepared from unsaturated esters of carbamic acid, preferably esters of alcohols having up to five carbon atoms such as allyl, methallyl, chlorallyl, crotyl, chlorocrotyl, propargyl, isopropenyl, isocrotyl, ethylallyl, butadienyl, tiglyl, methyl vinyl carbinyl, etc., carbamates. Carbamate esters of alcohols having six to ten carbon atoms such as phenylpropargyl, cinnamyl, chlorocinnamyl, hexenyl, etc., carbamates are also of utility. Although the carbamates having shorter carbon chains are of greater importance, the longer chained carbamates such as oleyl and linoleyl carbamate are also useful.

The new compounds may be prepared from the sodium derivative of the amide. This derivative may be prepared by reacting the acid amides with metallic sodium, preferably in the presence of an inert diluent such as benzene, toluene, etc., or mixtures thereof which may be varied so that the reaction may be conducted at the reflux temperature. The sodium usually is added slowly over a period of one to two hours while the temperature is maintained between 70 and 100° C. The sodium substituted product is then reacted with a polychloroformate of a polyhydroxy compound such as ethylene bis chloroformate or the chloroformates of propylene glycol, trimethylene glycol, isobutylene glycol, tetramethylene glycol, trimethylene glycol, di-, tri-, or tetraethylene glycol, di-, tri-, or tetrapropylene glycol, or the butylene glycols, glycerine, the polyglycerols, pentaerythritol, dextrose, sucrose, resorcinol, pyrogallol, etc.

The chloroformates are slowly added to the cooled solution of the unsaturated sodium substituted amide. After the reactants are completely combined the mixture is refluxed for an hour, diluted with water and separated into two liquid phases. The benzene or other diluent may then be evaporated from the non-aqueous layer and the resulting solid product may be purified by recrystallizing from suitable solvents.

The new class of compounds are usually white solids of relatively low melting point which are soluble in solvents such as benzene, chloroform, acetone, toluene, xylene, or petroleum ether. The new polyunsaturated amides are stable compounds but they may be polymerized in the presence of hydrogen peroxide, organic peroxides, ultraviolet light and other catalysts to form hard insoluble products with macromolecular structures.

The new compounds are capable of polymerization to form solid polymers in the presence of catalysts such as hydrogen peroxide, oxygen, organic peroxides, ultraviolet light, heat, etc. The resin products may be fabricated by methods well known to the prior art. Accordingly, the materials may be cast polymerized with or without admixture of suitable solvents to form solid polymers of any desirable shape. Compositions may also be prepared by partially polymerizing to a fusible powder and molding by injection or fusion under pressure. Such compositions may also contain pigments, fillers, dyes, and/or fibrous reinforcement. Coating compositions may be made by incorporating in addition solvents and polymerizing a film applied to objects of wood, paper, metal, or other materials.

The polymers may be modified by incorporating plasticizers or by copolymerizing in the presence of butadiene, vinyl chloride, vinyl acetate, or other vinyl compounds, phenolic resins, cellulose esters, urea plastics, acrylic esters or similar compounds, unsaturated alcohol esters of polybasic acids, vinylidene chloride, etc., or with other synthetic or natural resins.

The preparation of this group of compounds is more fully described in the following examples:

Example I

Metallic sodium (4.6 grams) was added gradually to a mixture of 100 cc. benzene and 23 grams of methallyl carbamate while the same was being heated at reflux temperature. The mixture was cooled and thoroughly mixed with 18.7 grams of ethylene bis chloroformate added dropwise. The mixture was heated for one hour at reflux temperature. The mixture was diluted with water and the benzene layer containing the new amide separated. After the benzene was evaporated a white solid was obtained which was recrystallized from methyl alcohol. The white solid melted at 130–131° C. and became polymerized by heating with 5 percent acetone peroxide at 150° C. The monomer was believed to have the structure:

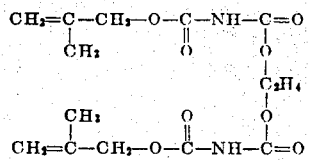

Ethylene bis (N-carbomethallyloxy carbamate)

Example II

A mixture of 70.2 grams of acrylamide, 500 cc. of benzene and 0.8 grams of pyrogallol were heated to the reflux temperature. Metallic sodium (24.1 grams) was added in pieces of one to two grams over a period of fifteen minutes and then refluxed for one hour more. The solution of the sodium substituted amide was cooled and 115 grams of diethylene glycol bis (chloroformate) were added at the rate of 10 to 20 grams per minute. The mixture was then refluxed for an additional hour. The semisolid mass was washed with water and the benzene solution was separated and dried. When heated to evaporate the benzene a solid mass precipitated which became a white crystalline material when it was recrystallized from benzene. It had the structure:

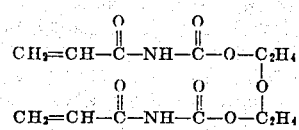

Diethylene glycol bis (N-carbovinyl carbamate)

Example III

Example I was repeated using allyl carbamate in place of methallyl carbamate and diethylene glycol bis chloroformate in place of ethylene bis chloroformate. An ester-amide of the following molecular structure was produced:

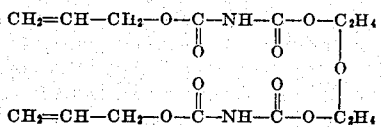

Diethylene glycol bis (N-carballyloxy carbamate)

Example IV

The procedure of Example I was used except that allyl carbamate was substituted for methallyl carbamate. The following chemical compound was prepared:

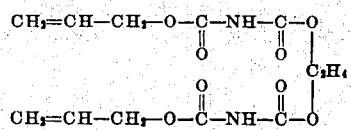

Ethylene bis (N-carballyloxy carbamate)

Although the present invention has been described with particular reference to the specific details of certain embodiments thereof, it is not intended that such details shall be regarded as limitations upon the scope of the invention except insofar as included in the accompanying claims.

I claim:

1. Ethylene bis (N-carbomethallyloxy carbamate).
2. Diethylene glycol bis (N-carballyloxycarbamate).
3. Alkylene bis (N-carbomethallyloxy carbamate).
4. Dialkylene glycol bis (N-carballyloxy carbamate).
5. Alkylene bis (N-carballyloxy carbamate).
6. Ethylene bis (N-carballyloxy carbamate).
7. A polymer of ethylene bis (N-carbomethallyloxy carbamate).
8. A polymer of diethylene glycol bis (N-carballyloxy carbamate).
9. A polymer of ethylene bis (N-carballyloxy carbamate).
10. A compound having the following structural formula:

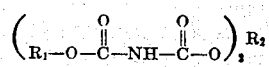

wherein $R_1$ is a radical corresponding to the radical $R_1$ in the alcohol $R_1OH$, said alcohol being an unsaturated monohydric alcohol having from 3 to 10 carbon atoms and having an unsaturated carbon-to-carbon linkage in an aliphatic carbon chain adjacent the beta carbon atom therein, and $R_2$ is a divalent radical selected from the group consisting of the divalent saturated aliphatic hydrocarbon radicals and radicals represented by the formula:

in which $R_3$ is an alkylene radical and $n$ is a small whole number.

11. A polymer of a compound defined by claim 10.

ALBERT G. CHENICEK.